US009043653B2

(12) United States Patent
Martineau et al.

(10) Patent No.: US 9,043,653 B2
(45) Date of Patent: May 26, 2015

(54) INTROSPECTION OF SOFTWARE PROGRAM COMPONENTS AND CONDITIONAL GENERATION OF MEMORY DUMP

(75) Inventors: James I. Martineau, Lowell, MA (US); Lorelei M. McCollum, Somerville, MA (US); Micheal S. McCowan, Ayer, MA (US)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 13/600,383

(22) Filed: Aug. 31, 2012

(65) Prior Publication Data

US 2014/0068341 A1    Mar. 6, 2014

(51) Int. Cl.
*G06F 11/00* (2006.01)
*G06F 11/34* (2006.01)
*G06F 11/07* (2006.01)

(52) U.S. Cl.
CPC ............ *G06F 11/34* (2013.01); *G06F 11/0778* (2013.01)

(58) Field of Classification Search
CPC .................................................. G06F 11/0778
USPC ....................................................... 714/38.11
See application file for complete search history.

(56) References Cited

U.S. PATENT DOCUMENTS

| 5,611,044 | A | * | 3/1997 | Lundeby | .................... 714/38.11 |
| 6,243,838 | B1 | | 6/2001 | Liu et al. | |
| 6,779,132 | B2 | | 8/2004 | Andress et al. | |
| 7,028,056 | B1 | | 4/2006 | Hendel et al. | |
| 7,243,267 | B2 | * | 7/2007 | Klemm et al. | .............. 714/38.11 |
| 7,383,471 | B2 | * | 6/2008 | Dall | ........................... 714/38.11 |
| 7,418,635 | B2 | | 8/2008 | Schulstad | |
| 7,818,616 | B2 | | 10/2010 | Kathail et al. | |
| 7,840,856 | B2 | * | 11/2010 | Apte et al. | ...................... 714/48 |
| 7,941,707 | B2 | | 5/2011 | Sarig et al. | |

(Continued)

FOREIGN PATENT DOCUMENTS

| JP | 4350734 A | 12/1992 |
| JP | 2006146504 A | 6/2006 |

(Continued)

OTHER PUBLICATIONS

International Search Report for application PCT/IB2013/058077, Date of actual completion of the international search Mar. 5, 2014.

*Primary Examiner* — Joshua P Lottich
(74) *Attorney, Agent, or Firm* — Arnold B. Bangali; Edward Choi (57) ABSTRACT

An approach for introspection of a software component and generation of a conditional memory dump, a computing device executing an introspection program with respect to the software component is provided. An introspection system comprises one or more conditions for generating the conditional memory dump based on operations of the software component. In one aspect, a computing device detects, through an introspection program, whether the one or more conditions are satisfied by the software component based on information in an introspection analyzer of the introspection program. In addition, the computing device indicates, through the introspection program, if the one or more conditions are satisfied by the software component. In another aspect, responsive to the indication, the computing device generates the conditional memory dump through the introspection program.

12 Claims, 4 Drawing Sheets

(56) References Cited

U.S. PATENT DOCUMENTS

| | | | |
|---|---|---|---|
| 8,510,523 B2* | 8/2013 | Szegedi et al. | 711/155 |
| 8,645,763 B2* | 2/2014 | Szegedi et al. | 714/38.11 |
| 2004/0153847 A1* | 8/2004 | Apte et al. | 714/43 |
| 2006/0143534 A1* | 6/2006 | Dall | 714/38 |
| 2008/0126879 A1 | 5/2008 | Tiwari et al. | |
| 2009/0216967 A1* | 8/2009 | Sugawara | 711/156 |
| 2009/0265695 A1 | 10/2009 | Karino | |

FOREIGN PATENT DOCUMENTS

| | | |
|---|---|---|
| JP | 2009259089 A | 11/2009 |
| WO | 20100148940 A1 | 12/2010 |

\* cited by examiner

INTROSPECTION OF SOFTWARE PROGRAM COMPONENTS AND CONDITIONAL GENERATION OF MEMORY DUMP

FIELD OF INVENTION

The present invention relates generally to generation of memory dumps, and more particularly to program introspection of software program components, and generation of a conditional memory dump based on the introspected software program components.

BACKGROUND

An operating system is a software program or a collection of software programs that operate on a computer to provide a platform on which software applications can execute. Examples of operating systems include, for example, Advanced Interactive eXecutive AIX® (Advanced Interactive eXecutive AIX® (AIX is a registered trademark of International Business Machines Corporation in the United States, other countries or both), IBM® z/VSE® (Virtual Storage Extended) (IBM and z/VSE are registered trademarks of International Business Machines Corporation in the United States, other countries or both), Linux® on System Z® (Linux is a registered trademark of Linus Torvalds in the United States, other countries or both, and System z is a registered trademark of International Business Machines Corporation in the United States, other countries or both), and the like. In addition, operating systems typically perform essential functions required to maintain proper operation of software applications executing on the computer. However, some software applications may experience error conditions. Further, a software error or crash can cause other software executing on the computer to cease execution of program instructions. A software developer or systems administrator may correct a defect in a software program to improve reliability and performance of the software program. Further, in order correct the defect in the software program, software developers typically employ a variety of methods or tools. One such tool is generation of a memory dump.

SUMMARY

In one embodiment, a method is provided for program introspection of a software component and generation of a conditional memory dump based on an exposed state of the introspected software component. The method comprises a computing device executing an introspection program with respect to the software component, wherein the introspection program comprises one or more conditions for generating the conditional memory dump based on operations of the software component. The method further comprises, the computing device detecting, through the introspection program, whether the one or more conditions are satisfied by the software component based on information of an introspection analyzer of the introspection program. The method further comprises, the computing device indicating, through the introspection program, if the one or more conditions are satisfied by the software component. The method further comprises, responsive to the indication, the computing device generating the conditional memory dump through the introspection program.

In another embodiment, a computer system is provided for program introspection of a software component and generation of a conditional memory dump. The computing system comprises, one or more processors, one or more computer-readable memories, one or more computer-readable tangible storage devices and program instructions which are stored on at least one of the one or more storage devices for execution by at least one of the one or more processors via at least one of the one or more memories. The computing system further comprises, program instructions to execute an introspection program with respect to the software component, wherein the introspection program comprises one or more conditions for generating the conditional memory dump based on operations of the software component. The computing system further comprises, program instructions to detect, through the introspection program, whether the one or more conditions are satisfied by the software component based on information of an introspection analyzer of the introspection program. The computing system further comprises, program instructions to indicate, through the introspection program, if the one or more conditions are satisfied by the software component. The computing system further comprises, program instructions to generate the conditional memory dump through the introspection program.

In another embodiment, a program product for program introspection of a software component and generation of a conditional memory dump. The program product comprises, one or more computer-readable tangible storage devices and program instructions stored on at least one of the one or more storage devices. The program product further comprises, program instructions to execute an introspection program with respect to the software component, wherein the introspection program comprises one or more conditions for generating the conditional memory dump based on operations of the software component. The program product further comprises program instructions to detect through the introspection program, whether the one or more conditions are satisfied by the software component based on information of an introspection analyzer of the introspection program. The program product further comprises, program instructions to indicate, through the introspection program, if the one or more conditions are satisfied by the software component. The program product further comprises program instructions to generate the conditional memory dump through the introspection program.

BRIEF DESCRIPTION OF THE SEVERAL VIEWS OF THE DRAWINGS

Novel characteristics of the invention are set forth in the appended claims. The invention itself, however, as well as preferred mode of use, further objectives, and advantages thereof, will be best understood by reference to the following detailed description of the invention when read in conjunction with the accompanying figures, wherein like reference numerals indicate like components, and:

DETAILED DESCRIPTION

Embodiments of the present invention comprise functionality for managing program introspection of one or more software program components by an introspection system application in a virtualized computing environment. One embodiment of the present invention further may comprise generation of a conditional memory dump by the introspection system application based on program operations of the introspected software program components. In particular, a memory dump is a recorded state of working memory of a software program on a computer, typically when the software program experiences a crash. In addition, memory dump generation can serve as a useful debugging aid for identifying the cause of the software program crash. Further, a memory dump can be generated sparingly, and a memory dump can be generated in the following scenarios: manual memory dump generation by a user or systems administrator, automatic generation of a memory dump by an operating system, and/or automatic generation of a memory dump by a software program that experiences crash or error.

Specifically, the present invention provides circuits or sub-assemblies of circuits as well as methods of operations that are performed to manage a plurality of conditions defined in the introspection system application of a computing device. The conditions are defined in the introspection system application to expose the state of program operations of the introspected software components, according to one embodiment of the invention. In one aspect, the introspection system application operates in the virtualized computing environment to monitor the execution of program operations of the software program components. The introspection system application also operates to detect whether the defined conditions are satisfied by the monitored software components based on information stored in an introspection analyzer of the introspection system application. In one aspect, the introspection analyzer operates to query the exposed state of operation of the introspected software components to determine whether the plurality of conditions is satisfied by the software components. The introspection system application further operates to indicate if the defined conditions are satisfied by the executed software components based on the queried state of operation of the introspected software components by the introspection analyzer. In another aspect, responsive to the indication, the introspection system application automatically triggers a memory dump generation based on the exposed state of program operations of the software components, as described in further detail below, according to embodiments of the present invention.

Figure 1:
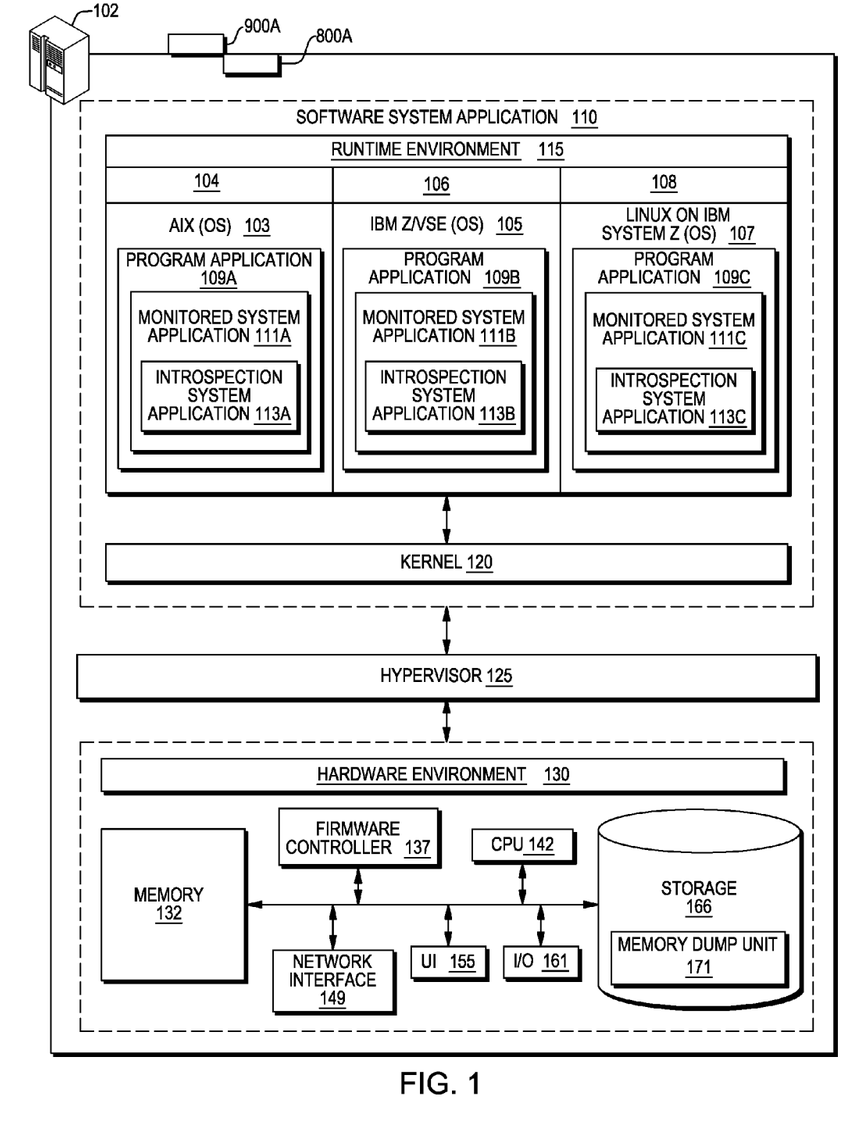
FIG. 1, illustrates a computing environment for generating memory dumps, according to an embodiment of the present invention.

Further aspects of the present invention will now be described in conjunction with the figures. Referring now to FIG. 1, an illustration of a virtual computing environment for automatically generating memory dumps based on conditions defined in an introspection system application is depicted. For example, the introspection system application will generate a memory dump if the defined conditions are satisfied by software program components that are executed in virtualized computing environment, according to embodiments of the present invention.

In one embodiment, virtual computing environment can be hosted by a computer system including one or more computing machines. Further, multiple virtual systems can be created within virtual computing environment. Virtual computing environment can be a stand-alone computer, or alternatively, a computing system utilizing a cluster of computers. In another embodiment, virtual computing environment can be an independent operating environment that utilizes virtual resources of a computing system. Specifically, the virtual resources can include logical divisions of physical resources, such as processors, memory and input/output adapters. For example, virtual computing environment can allow multiple types of operating systems to run within virtual machines on a single server, and also share the physical resources of the server.

In the depicted embodiment, virtual computer environment may comprise computing device 102. Computing device 102 can be, for example, a laptop, tablet, or notebook personal computer (PC), a desktop computer, a mainframe or mini computer, a personal digital assistant (PDA), or a smart phone such as a Blackberry® (Blackberry is a registered trademark of Research in Motion Limited (RIM) Inc., in the United States, other countries, or both) or iPhone® (iPhone is a registered trademark of Apple Inc., in the United States, other countries, or both), respectively. Computing device 102 can also be, for example, a server computing system such as a management server, a web server, or any other electronic device or computing system capable of receiving and sending data, according to one embodiment of the present invention. In addition, the server computing system can also represent a "cloud" of computers interconnected by one or more networks, wherein the server computing system can be a primary server for a computing system utilizing clustered computers when accessed through virtual computing environment. For example, a cloud computing system can be a common implementation of a management system that operates to manage application program introspection of one or more software program components in a virtualized computing environment, and execution of one or more functions to generate a conditional memory dump based on the introspected software program components. Further, computing device 102 maintains internal components 800A and external components 900A. In general, computing device 102 can be any programmable computing device as described in further detail below.

Computing device 102 comprises software system application 110 and hardware environment 130. Software system application 110 executes program applications in an operating system environment supported by hardware environment 130, according to an embodiment of the present invention. In particular, software system application 110 and hardware environment 130 operate to manage application program introspection of one or more software program components executing within computing device 102 of virtual computing environment. Software system application 110 and hardware environment 130 further operate to manage the generation of conditional memory dump based on the introspected software program components. The memory dump is generated by the introspection system application in software system application 110 and hardware environment 130 of computing device 102, according to one embodiment of the present invention.

Hardware environment 130 includes memory 132, network interface 149, firmware controller 137, user interface (UI) 155, I/O 161, CPU 142 and storage 166.

Memory 132 may comprise, for example, one or more computer-readable storage media, which may include random-access memory (RAM) such as various forms of dynamic RAM (DRAM), e.g., DDR2 SDRAM, or static RAM (SRAM), flash memory, or any other form of fixed or removable storage medium that can be used to carry or store desired program code and program data in the form of instructions or data structures and that can be accessed by other components of software system application 110. In some embodiments, memory 132 provides a physical address space composed of addressable memory locations for one or more program applications that operate to execute program instructions in software system application 110. Network interface 149 is adapted to transmit or receive communication between components of computing device 102. Firmware controller 137 operates to internally control the circuits and subassemblies of computing device 102. User interface (UI) 155 comprises a peripheral to enable interaction between a system administrator or user and computing device 102.

CPU 142 executes program instructions loaded into memory 132 from storage 166 in order to support execution of program applications in software system application 110, wherein the program applications are executed to manage generation of conditional memory dump based on operational conditions of an introspected software program as described in more detail below, in accordance with one embodiment of the present invention. CPU 142 further comprises one or more general purpose processors such as a digital signal processor (DSP), an application specific integrated circuit (ASIC), a field programmable gate array (FPGA), or any other equivalent logic device. Therefore, the terms "processor" or "controller," as used herein, may refer to any one or more of the foregoing structures or any structure suitable for implementation of embodiments of the present invention as described in more detail below.

I/O 161 includes devices to process, propagate or display signals or data received or sent through circuits or subassemblies of circuits comprising computing device 102. In addition, storage device 166 comprises non-transitory, computer-readable media, such as computer-readable storage media that includes volatile and/or non-volatile, removable and/or non removable media implemented in any method or technology for storage of information, such as, processor-readable instructions, data structures, program modules, or other data. Non-transitory, computer-readable media includes, but is not limited to, random access memory (RAM), read-only memory (ROM), EEPROM, FLASH memory or other optical storage, magnetic devices or any other medium that can be used to store the desired information and that can be accessed by other components of software system application 110. Storage device 166 includes memory dump unit 171. Memory dump unit 171 operates to store memory image (or content) of memory 132 components of computing device 102, according to one embodiment of the present invention.

Software system application 110 operates to execute one or more program instructions within computing device 102 of virtual computing environment to generate conditional memory dump based on conditions that are defined in an introspection system application 113 A, B, C. The conditions are defined in the introspection system application 113 A, B, C to expose the state of program operations of one or more software components operating within an operating system of software system application 110, as described in further detail below, in accordance with embodiments of the present invention. Software system application 110 includes runtime environment 115 and kernel 120. In one embodiment, runtime environment 115 is resident in memory 132.

In particular, runtime environment 115 operates to support the execution of program applications that are executed within software system application 110. For example, runtime environment 115 can contain implementations of basic low level commands, and may also implement higher level commands of program applications operating within software system application 110. In one aspect, runtime environment 115 can support monitoring, and debugging of program execution of one or more software components within software system application 110. In particular, the one or more software components are monitored by an introspection system application 113 A, B, C based on conditions that are defined within the introspection program. In another embodiment, the introspection system application 113 A, B, C indicates if the defined conditions are satisfied by the executed software component. Further, responsive to the indication, the introspection system application 113 A, B, C automatically triggers memory dump generation.

Kernel 120 operates to manage the execution of program applications within runtime environment 115. For example, kernel 120 may include functionality to initialize, run, and/or terminate program application 109 A, B, C, as well as one or more processors used to execute program application 109 A, B, C. Particularly, kernel 120 operates to manage resources between software system application 110 and hardware environment 130 of computing device 102. For example, runtime environment 115 can be divided into multiple partitions within computing device 102. In this case, each logical partition operates like an independent operating system executing its own operating environment (i.e., virtual machine) to manage application program introspection of one or more software program components that are executed in computing device 102. The LPARscan operate to facilitate generation of conditional memory dump based on the introspected software program components. In addition, the LPARscan provide memory management for computing device 102 by allowing software system application 110 to install and execute multiple applications and processors for managing application program introspection of one or more software program components, according to one embodiment of the present invention. In particular, software system application 110 includes LPARs 104, 106 and 108.

Logical Partitions 104, 106 and 108, also known as LPAR, are a subset of hardware environment 130. In one embodiment, computing device 102 can be partitioned into multiple logical partitions, each hosting a separate operating system. In particular, LPARs 104, 106, and 108 are illustrative examples of computing device 102. Further, other operating environments and combinations of operating environments of computing device 102 can utilize instructions to manage generation of conditional memory dump in an introspection system application 113 A, B, C based on conditions defined in the introspection system application 113 A, B, C to monitor software components within the operating system, according to an embodiment of the present invention.

LPARs 104, 106, and 108 execute an independent operating environment, such as, an operating system (OS) including, for example, OS 103, 105, and 107 to execute program instructions to manage generation of conditional memory dump in an introspection system application 113 A, B, C based on conditions defined in the introspection system application 113 A, B, C as detailed below. In one embodiment, OS 103, 105, and 107 operate to provide a software platform on which application programs can be executed. In addition, OS 103, 105, and 107 manages access to storage resources of hardware environment 130, computational resources, and also rendering resources of computing device 102. In one embodiment, an introspection system application 113 A, B, C executes program instructions within OS 103, 105, and 107 to monitor software components that operate within OS 103, 105, and 107 based on conditions defined within the introspection program. Further, the introspection system application 113 A, B, C can execute a command to generate a debuggable dump file that can be used for debugging purposes, which is based on the monitored software components. Further, OS 103, 105, and 107 can provide memory management of computing device 102, and also allow computing device 102 to install, and execute multiple applications and processes corresponding to the applications that are executed within the OS 103, 105 and 107, including, for example, an introspection system application 113 A, B, C, according to one embodiment of the present invention. In particular, OS 103, 105, and 107 can operate in a computing operating environment, or a database, under which various other smaller application programs can be implemented to run.

For example, an introspection system application 113 A, B, C can be executed within the software platform provided by OS 103, 105, and 107 to monitor operation of one or more software program components within the software system application 110, and generate a memory dump based on conditions defined within the introspection system application 113 A, B, C for monitoring the software program components. Further, OS 103, 105, and 107 can operate as a virtual machine domain, and manage the entire virtual computing environment when virtual computing environment is booted to execute program instructions, according to one embodiment of the present invention.

In the depicted embodiment, LPAR 104 executes an OS 103. Further, OS 103 can be the Advanced Interactive eXecutive AIX® operating system. In addition, LPAR 106 executes OS 105. OS 105 can be the IBM® z/VSE® (Virtual Storage Extended). Further, LPAR 108 executes OS 107. OS 107 can be the Linux® on a System z® computing system. Other operating environments and combinations of operating environments may be utilized, in accordance with one embodiment of the present invention. Further, any number of partitions can be created, and may exist on separate physical computers of a clustered computer systems operating within virtual computing environment to manage application program introspection of one or more software program components that are executed in software system application 110, and also facilitate generation of a conditional memory dump based on the introspected software program components. In one embodiment, management of application program introspection of one or more software program components in OS 103, 105, and 107 can be confined to a specific virtual machine, for example, logical partition 104, 106, and 108, respectively.

Further, specific confinement of operations LPARs 104, 106, and 108 in software system application 110, may not affect execution of other operating systems on other virtual machines operating within computing device 102. Accordingly, each LPAR 104, 106, and 108 may correspond to a logical grouping of software, resources, identity within software system application 110 that is distinct from that of other logical partitions, respectively. For example, each LPARs 104, 106, and 108 may include an operating system kernel 120, patches for the kernel 120, and tuning parameters for the kernel 120.

Hypervisor 125 performs standard operating system functions and manages communications between LPARs 104, 106, and 108. For example, hypervisor 125 dynamically allocates and deallocates dedicated or shared hardware resources in hardware environment 130 across LPARs 104, 106, 108 while the partitions are actively in use. Dynamic allocation and deallocation allows hypervisor 125 to dynamically redefine all available system resources to reach optimum capacity for each one of LPARs 104, 106, and 108 operating in computing device 102.

LPARs 104, 106, and 108 each include program application 109 A, B, C, respectively. Program application 109 A, B, C execute one or more introspection system application 113 A, B, Cs within OS 103, 105, and 107 to monitor operation of one or more software program components within the software system application, according embodiments of the present invention. Specifically, program application 109 A, B, C includes monitored system application 111 A, B, C.

Monitored system application 111 A, B, C can be software systems that is executed within OS 103, 105, and 107 to expose the state of program operation of monitored system application 111 A, B, C, according to one embodiment of the present invention. For example, monitored system application 111 A, B, C can provide integrated collaboration functionality when executed within OS 103, 105, 107. In one aspect, monitored system application 111 A, B, C can provide functionalities, including for example, email, calendaring, contacts management, instant messaging, voice and video conferencing, online meetings, discussions, forums, and user directories. In another example, monitored system application 111 A, B, C can be the IBM®Lotus Notes® (IBM and Lotus Notes are registered trademarks of International Business Machines Corporation in the United States, other countries of both), that is executed within OS 103, 105, and 107 to expose the state of program operation of the monitored system application 111a b, c. Further, monitored system application 111 A, B, C can be an application under test that is executed in runtime environment 115, according to one embodiment of the present invention. Monitored system application 111 A, B, C includes introspection system application 113 A,C, C.

Introspection system application 113 A, B, C monitors the execution of program operations of monitored system application 111 A, B, C. Introspection system application 113 A, B, C include a set of conditions written by a software developer or user. The conditions are defined within introspection system application 113 A, B, C to analyze, and expose the state of program operations of monitored system application 111 A, B, C. Further, introspection system application 113 A, B, C operate to manage variables, conditions or a set of program instructions, defined in introspection system application 113 A, B, C, to also expose the state of program operation of monitored system application 111 A, B, C. Introspection system application 113 A, B, C generate a memory dump based on the exposed state of operation of monitored system application 111 A, B, C. Further, various conditions may be defined within introspection system application 113 A, B, C, to monitor program state of monitored system application 111 A, B, C, and generation of a memory dump by introspection system application 113 A, B, C based on the monitored program state of monitored system application 111 A, B, C, according to one embodiment of the present invention.

In one embodiment, introspection system application 113 A, B, C monitors monitored system application 111 A, B, C periodically, random, and/or using event-based monitoring to detect whether the defined conditions are satisfied by monitored system application 111 A, B, C. In addition, introspection system application 113 A, B, C automatically performs the memory dump generation if the conditions are satisfied by monitored system application 111 A, B, C during program operation of monitored system application 111 A, B, C. Further, the expected operation of each operating system, including, for example, OS 103, 105, and 107 are determined based coding specific to each of the operating systems. Hence, the expected operation of the operating system may correspond to the underlying functionality of the operating system as intended by the designer, architect, engineer of the operating system and/or system administrator. Therefore, the conditions defined in introspection system application 113 A, B, C, to monitor program state of monitored system application 111 A, B, C, may be written by a person who is familiar with architecture and/or intended functionality of monitored system application 111 A, B, C of OS 103, 105, and 107, respectively. In particular, introspection system application 113 A, B, C can include tracing and probing features, for example, to permit examination of variables within the software component, and to "hook" into monitored system application 111a b, c, and assemble information that pertains to system operation of monitored system application 111a b, c. Further, introspection system application 113 A, B, C can be an integrated development environment (IDE) software application that provides comprehensive analysis of operations of monitored system application 111a b, c. In addition, introspection system application 113 A, B, C also operates to detect whether the defined conditions are satisfied by monitored system application 111 A, B, C based on information in an introspection analyzer of introspection system application 113 A, B, C as described in further detail below. In another embodiment, introspection system application 113 A, B, C indicates if the defined conditions are satisfied by monitored system application 111 A, B, C. In addition, responsive to the indication, introspection system application 113 A, B, C automatically triggers memory dump generation in introspection system application 113 A, B, C within OS 103, 105, and 107, based on the exposed state of operation of monitored system application 111 A, B, C, according to one embodiment of the present invention.

In addition, introspection system application 113 A, B, C can be a plug-in or add-on software application that extends the functionality of monitored system application 111 A, B, C. In particular, introspection system application 113 A, B, C allow users, including for example, software developers and system administrators, to examine the activities of monitored system application 111 A, B, C, while monitored system application 111 A, B, C is executing based on conditions defined in introspection system application 113 A, B, C. In this manner, introspection system application 113 A, B, C generates a memory dump based on whether the conditions are satisfied by monitored system application 111 A, B, C, according to one embodiment of the present invention.

Further, introspection system application 113 A, B, C can be a web browser, a standalone web page data management application, a data management software application, or part of a service that operates to monitor the execution of program operations of monitored system application 111 A, B, C in an operating system, including for example, OS 103, 105, and 107. Examples of web browsers can include Internet Explorer® (Internet Explorer is a trademark of Microsoft Inc., in the United States, other countries, or both), Firefox® (Firefox is a trademark of Mozilla Corporation, in the United States, other countries, or both), Safari® (Safari is a trademark of Apple, Inc., in the United States, other countries, or both) and Google Chrome™ (Google Chrome is a trademark of Google, Inc., in the United States, other countries, or both), respectively. Further, introspection system application 113 A, B, C can include a web page or software program code, such as, for example, HyperText Markup Language (HTML) code or JavaScript.

Further, monitoring the execution of system application 111 A, B, C can involve monitoring low-level information such as memory pages, network packets, system calls, domain ranges of variables, code modules, data structures, hardware events, and input/output (I/O) events. Also, such low level externally observed information from monitored system application 111 A, B, C of OS 103, 105, and 107 may be understood by introspection system application 113 A, B, C because the conditions defined in introspection system application 113 A, B, Cs are created by a user who is familiar with the structure and intended operation of monitored system application 111 A, B, C of OS 103, 105, and 107.

Introspection system application 113 A, B, C may bridge the semantic gap between low level information and high level representations of data in the monitored system application 111 A, B, C of OS 103, 105, and 107. Further, the creation of defined conditions in introspection system application 113 A, B, C by a user who is familiar with the intended functionality of monitored system application 111 A, B, C A, B, C of OS 103, 105, and 107 may enable the semantic gap to be bridged even in proprietary operating systems, such as, for example, the AIX®, IBM Z/VSE, or other operating systems, according to one embodiment of the present invention. In the depicted example, each introspection system application 113 A, B, C may monitor one or more software components of OS 103, 105, and 107. Hence, one operating system executing within virtual computing environment may include multiple introspection system application 113 A, B, C, each of which operates to monitor a different area of execution within monitored system application 111 A, B, C of OS 103, 105, and 10.

Figure 2:
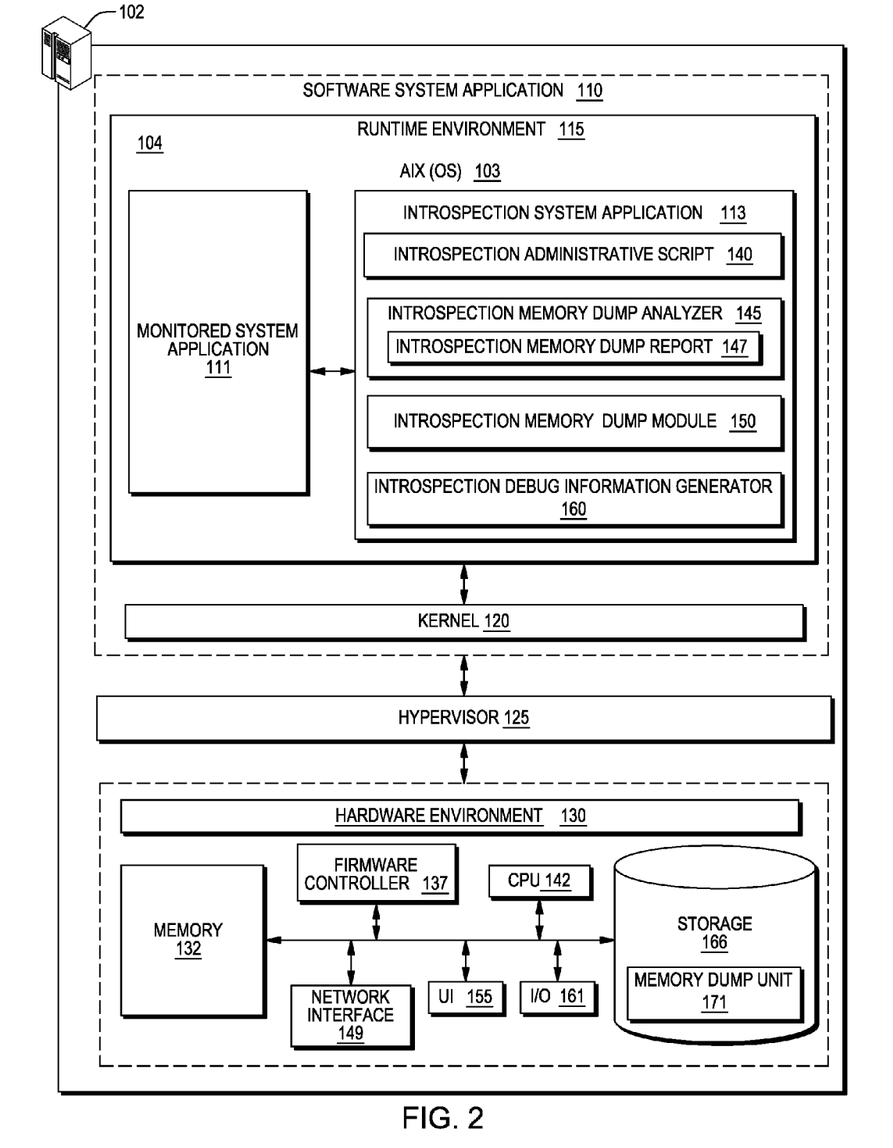
FIG. 2, illustrates program components of an introspection system application, according to an embodiment of the present invention.

Referring now to FIG. 2, a functional block diagram illustrating program components of introspection system application 113 A, B, C of FIG. 1 is depicted, according to one embodiment of the present invention. Introspection system application 113 A, B, C includes introspection administrative script 140, introspection analyzer 145, introspection memory dump module 150 and introspection debug information generator 160.

Introspection administrative script 140 includes rules or conditions written by a systems administrator or software developer in introspection system application 113 A,B, C describing a plurality of conditions under which a memory dump should be triggered by introspection system application 113 A, B, C based on whether the conditions are satisfied during execution of monitored system application 111 A, B, C. In particular, the conditions can include for example, monitoring of values of variable in monitored system application 111 A, B, C, monitoring of operating system (OS 103, 105, and 107) resource usage by monitored system application 111 A, B, C, monitoring of presence and order of elements on a stack in monitored system application 111 A, B, C and/or monitoring of throwing and catching of exceptions in monitored system application 111 A, B, C.

For example, a systems administrator or software developer can define the conditions in introspection administrative script 140 of introspection system application 113 A, B, C to monitor system application 111 A, B, C for a bank or financial industry's operating system. The following example of introspection of a system application in the bank or financial sector is for illustrative purposes only, and should not be construed as limiting the present invention. In particular, introspection of a system application in accordance with the present invention can be applied to numerous sectors or industries.

For instance, the systems administrator can define conditions in introspection system application 113 A, B, C, based on the following criteria: In one example, whenever the FUNDS_AVAILABLE variables change in value to a negative value, introspection system application 113 A, B, C generate memory dump for monitored system application 111 A, B, C of the bank's operating system. Accordingly, the systems administrator defines the FUNDS_AVAILABLE variable because the available funds for an account should never be less than 0 (i.e., have a negative value), and if such conditions exists an error condition has occurred in monitored system application 111 A, B, C of the bank's operating system. In another example, whenever monitored system application 111 A, B, C of the bank's operating system uses more than 1 GB of memory, introspection system application 113 A, B, C generates memory dump for monitored system application 111 A, B, C of the bank's operating system. Hence, the systems administrator defines an operating system resource usage by monitored system application 111 A, B, C because an overt usage of memory by monitored system application 111 A, B, C could indicate a memory leak in monitored system application 111 A, B, C. In yet another example, whenever a BANK_OPERATING_SYSTEM error exception is thrown, introspection system application 113 A, B, C generate memory dump for monitored system application 111 A, B, C of the bank's operating system. In one aspect, introspection system application 113 A, B, C continuously monitor the monitored system application 111 A, B, C based on the defined conditions in introspection administrative script 140. Further, the systems administrator does not need to halt or stop introspection system application 113 A, B, C, thus allowing the systems administrator to look at the state of program execution of monitored system application 111 A, B, C on a dynamic basis.

Therefore, introspection system application 113 A, B, C can be configured to substantially monitor system application 111 A, B, C during execution of monitored system application 111 A, B, C in OS 103, 105, and 107. In particular, in order to evaluate the defined conditions in introspection administrative script 140 (for example, in order for introspection system application 113 A, B, C to monitor the monitored system application 111 A, B, C such that the value of a particular variable is known in the monitored system application 111 A, B, C), introspection system application 113 A, B, C may utilize "introspection," of monitored system application 111 A, B, C in an operating system, including for example, OS 103, 105, and 107, to examine the state of program execution in monitored system application 111 A, B, C, and generate memory dumps as necessary based on the monitored state of program execution in monitored system application 111 A, B, C, according to one embodiment of the present invention.

Introspection analyzer 145 monitors the execution of all exposed internal variable values and the state of all program components of monitored system application 111 A, B, C in memory 132 based on the conditions defined in introspection administrative script 140. In one embodiment, introspection analyzer 145 queries the state of operation of monitored system application 111 A, B, C directly via a debugger or some similar mechanism, to assess whether a condition is satisfied by monitored system application 111 A, B, C. Introspection analyzer 145 gathers and stores information related to monitored system application 111 A, B, C during runtime execution of monitored system application 111 A, B, C.

In another embodiment, the information gathered and stored by introspection analyzer 145 may include, for example, trace data, diagnostic memory dumps, run reports, (logs e.g., error logs), results of execution of all exposed internal values, and the like. Introspection analyzer 145 may comprise introspection report 147. In one embodiment, if monitored system application 111 A, B, C satisfies one or more of the conditions defined in introspection administrative script 140, introspection analyzer 145 automatically triggers a memory dump request by transmitting introspection report 147 to introspection memory dump module 150 based on the exposed state of all program components of monitored system application 111 A, B, C.

In particular, introspection report 147 operates to indicate the amount of memory allocated to monitored system application 111 A, B, C that should be dumped, or indicate a subset of such memory that should be dumped based on one or more conditions that are satisfied by monitored system application 111 A, B, C, according to one embodiment of the present invention. Responsive to the indication of the amount of memory allocated, introspection memory dump module 150 performs a memory dump on behalf of introspection analyzer 145 by executing memory dump acquisition to memory dump unit 171 of storage 166. In addition, the execution of memory dump acquisition to memory dump unit 171 can include, for example, copying and storing a memory image of memory 132 of monitored system application 111 A, B, C into memory dump unit 171 of storage 161. Introspection debug information generator 160 generates debug information based on one or more conditions defined in introspection administrative script 140 that are satisfied by monitored system application 111 A, B, C. In addition, the debug information may be used to determine a diagnostic action that can be performed by a systems administrator or user based on the exposed state of operation of monitored system application 111 A, B, C in OS 103, 105, and 107.

Figure 3:
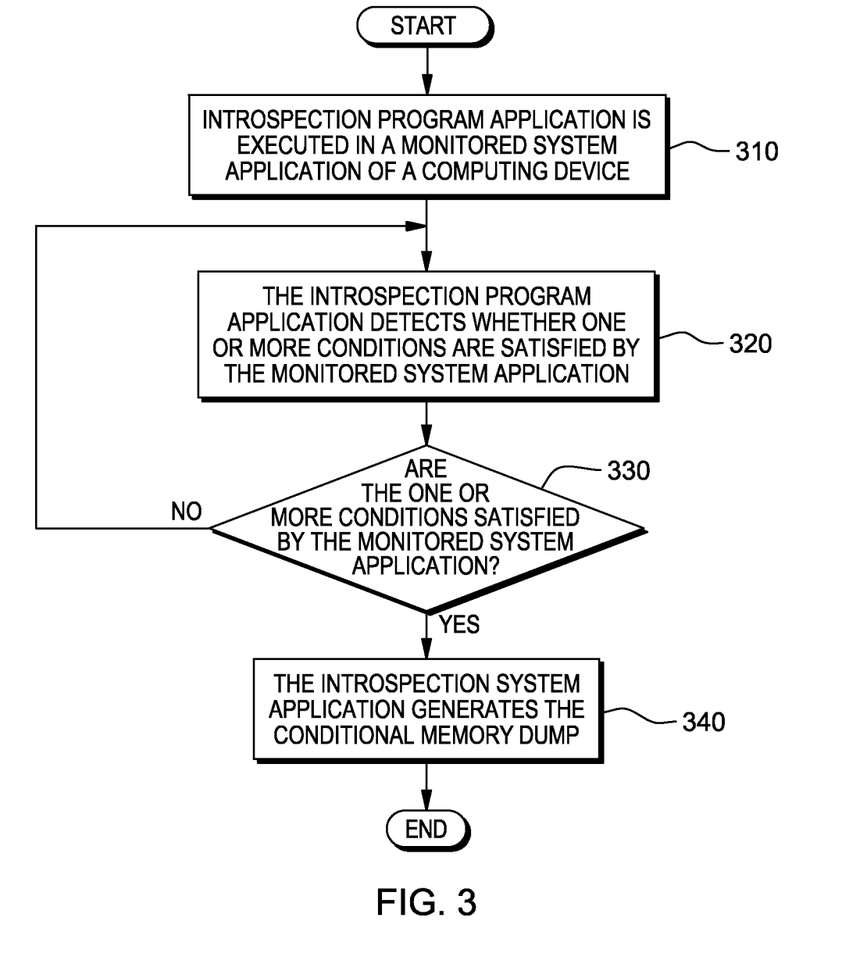
FIG. 3 is a flowchart depicting steps performed by an introspection system application, according to an embodiment of the present invention.

FIG. 3 is a flowchart depicting the steps performed by introspection system application 113 A, B, C of runtime environment 115 of computing device 102 of FIG. 1, according to one embodiment of the present invention.

In step 310, introspection system application 113 A, B, C is executed within runtime environment 115 of computing device 102 to manage a plurality of conditions defined in introspection system application 113 A, B, C of computing device 102. Further, the conditions are defined in introspection system application 113 A, B, C to expose the state of program operations of software components of monitored system application 111 A, B, C. In addition, the conditions can include, for example, monitoring of values of variables in monitored system application 111 A, B, C, monitoring of operating system (OS 103, 105, and 107) resource usage by monitored system application 111 A, B, C, monitoring of presence and order of elements on a stack in monitored system application 111 A, B, C and/or monitoring of throwing and catching of exceptions in monitored system application 111 A, B, C.

In step 320, introspection system application 113 A, B, C detects whether the conditions are satisfied by the state of program operations of software components of monitored system application 111 A, B, C, based on information in introspection analyzer 145 of introspection system application 113 A, B, C. Introspection analyzer 145 operates to store information that pertains to monitored system application 111 A, B, C. In particular, introspection analyzer 145 queries the exposed state of operation of monitored system application 111 A, B, C, to determine whether the one or more conditions are satisfied by monitored system application 111 A, B, C. At decision 330, introspection system application 113 A, B, C indicates whether the one or more conditions are satisfied by the state of program operations of software components of monitored system application 111 A, B, C. If the conditions are satisfied by the state of program operations of software components of monitored system application 111 A, B, C, at step 340, introspection system application 113 A, B, C generate a memory dump. In one aspect, after assessing if the conditions are satisfied by monitored system application 111 A, B, C, monitored system application 111 A, B, C step forward in execution of program components within OS 103, 105, and 107. However, if the conditions are not satisfied by the exposed state of program operations of monitored system application 111 A, B, C, at step 320, the introspection system application may detect whether the conditions are satisfied by the state of program operations of monitored system application 111 A, B, C based on introspection analyzer 145 of introspection system application 113 A, B, C.

Figure 4:
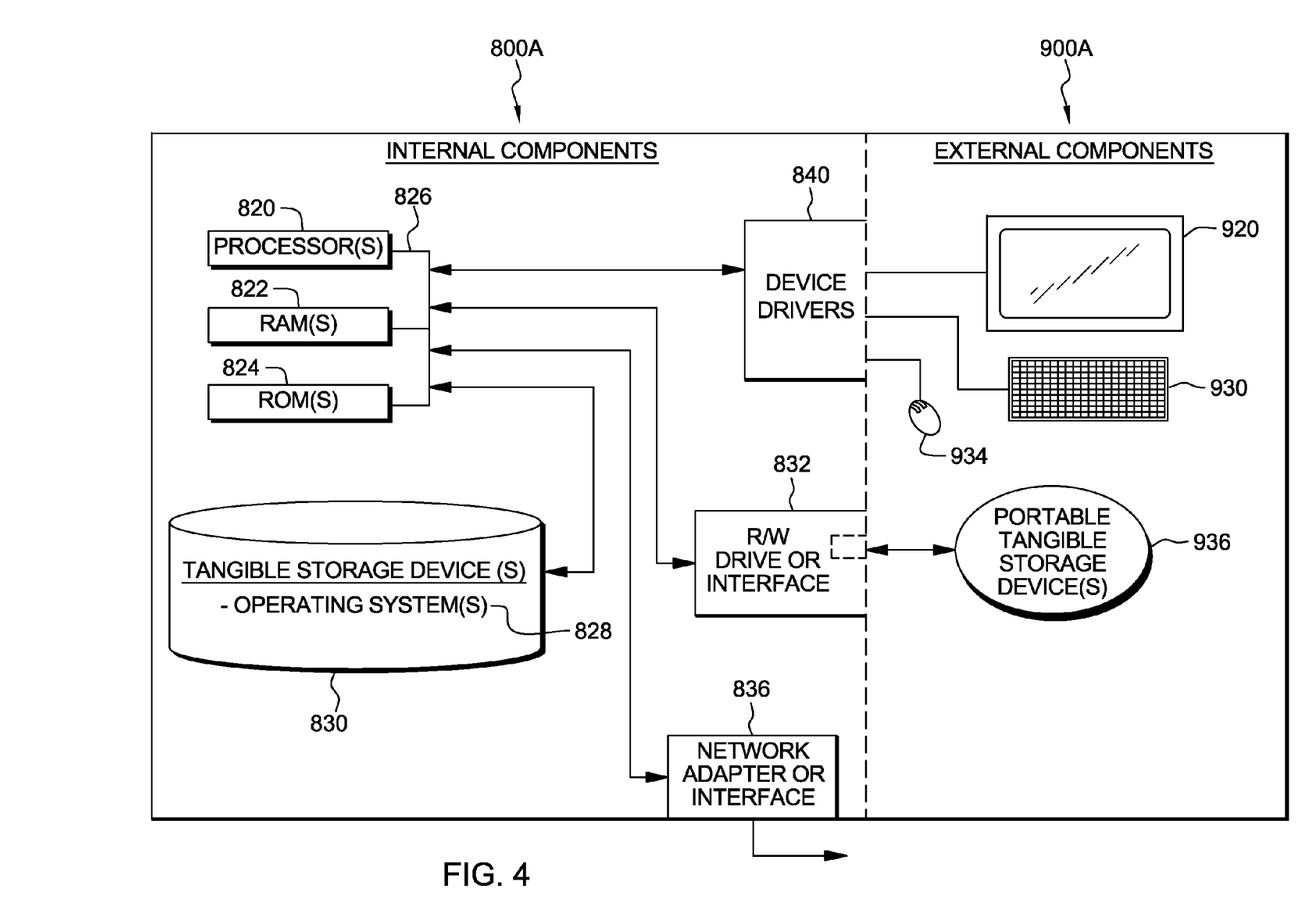
FIG. 4 illustrates a block diagram of components of computer system, according to an embodiment of the present invention.

FIG. 4 illustrates a block diagram of hardware and software components of a computer, such as computing device 102 of FIG. 1, according to one embodiment of the present invention.

Computing device 102 includes a respective set of internal components 800 and external components 900A, illustrated in FIG. 1. Each of the sets of internal components 800A includes one or more processors 820, one or more computer-readable RAMs 822 and one or more computer-readable ROMs 824 on one or more buses 826, one or more operating systems 828 and one or more computer-readable tangible storage devices 830. The one or more operating systems 828 and monitored system application 111A, B, C and introspection system application 113A, B, C, (computing device 102) are stored on one or more of the respective computer-readable tangible storage devices 830 for execution by one or more of the respective processors 820, via one or more of the respective RAMs 822 (which typically include cache memory). In the illustrated embodiment, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800A also includes a R/W drive or interface 832 to read from and write to one or more portable computer-readable tangible storage devices 936 such as a CD-ROM, DVD, memory stick, magnetic tape, magnetic disk, optical disk or semiconductor storage device. The monitored system application 111 A, B, C and introspection system application 113 A, B, C, (computing device 102) can be stored on one or more of the respective portable computer-readable tangible storage devices 936, read via the respective R/W drive or interface 832 and loaded into the respective hard drive or computer-readable tangible storage device 830.

Each set of internal components 800A also includes a network adapter or interface 836 such as a TCP/IP adapter card or wireless communication adapter (such as a 4G wireless communication adapter using OFDMA technology). The monitored system application 111A, B, C and introspection system application 113A, B, C, (computing device 102) can be downloaded to the respective computing/processing devices from an external computer or external storage device via a network (for example, the Internet, a local area network or other, wide area network or wireless network) and network adapter or interface 836. From the network adapter or interface 836, the programs are loaded into the respective hard drive or computer-readable tangible storage device 830. The network may comprise copper wires, optical fibers, wireless transmission, routers, firewalls, switches, gateway computers and/or edge servers.

Each of the sets of external components 900A includes a display screen 920, a keyboard or keypad 930, and a computer mouse or touchpad 934. Each of the sets of internal components 800A also includes device drivers 840 to interface to display screen 920 for imaging, to keyboard or keypad 930, to computer mouse or touchpad 934, and/or to display screen 920 for pressure sensing of alphanumeric character entry and user selections. The device drivers 840, R/W drive or interface 832 and network adapter or interface 836 comprise hardware and software (stored in computer-readable tangible storage device 830 and/or ROM 824).

The programs can be written in various programming languages (such as Java, C++) including low-level, high-level, object-oriented or non object-oriented languages. Alternatively, the functions of the programs can be implemented in whole or in part by computer circuits and other hardware (not shown).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.,) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

In addition, any combination of one or more computer-readable medium(s) may be utilized. The computer-readable medium may be a computer-readable signal medium or a computer-readable storage medium. A computer-readable storage medium may be for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like, conventional procedural programming languages such as the "C" programming language, a hardware description language such as Verilog, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Based on the foregoing a method and system for program introspection of a software component, and generation of conditional memory dump based on the introspected software components, has been described. However, numerous modifications and substitutions can be made without deviating from the scope of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. Therefore, the present invention has been disclosed by way of example and not limitation.

What is claimed is:

1. A method for program introspection of a software component and generation of a conditional memory dump, the method comprising the steps of:
   executing an introspection program with respect to the software component, wherein the introspection program comprises one or more conditions for generating the conditional memory dump during operations of an operating system of the software component, wherein the one or more conditions are monitored based on at least one of, values of variables in the software component executed in the operating system, operating system usage by the software component executed in the operating system, presence and order of elements on a stack in the software component executed in the operating system, and failure of exceptions in the software component executed in the operating system;
   detecting, through the introspection program, whether the one or more conditions are satisfied by the software component based on information of an introspection analyzer of the introspection program, wherein the introspection analyzer queries exposed state of operations of the software component, during the operations of the operating system, to determine whether the one or more conditions are satisfied by the software component;
   responsive to the detection, generating the conditional memory dump through the introspection program, if at least one of the one or more conditions are satisfied by the software component during the operations of the operating system; and
   wherein one or more of the steps are performed by a computing device.

2. The method according to claim 1, wherein the one or more conditions are defined in the introspection program by a systems administrator or user describing conditions under which memory dumps should be automatically generated based on the operations of the software component.

3. The method according to claim 1, wherein the step of generating the conditional memory dump further comprises the step of:
   copying, through the introspection program, a memory image of a runtime environment of the software component into a memory dump unit of a storage device.

4. The method of claim 1, wherein the introspection program comprises an introspection debug generator that generates debug information if the one or more conditions are satisfied by the executed software component.

5. The method according to claim 4, wherein the debug information is used to determine one or more diagnostic actions in the software component.

6. The method according to claim 1, further comprising the step of:
   indicating, through the introspection program, if the one or more conditions are satisfied by the software component.

7. A computer system for program introspection of a software component and generation of a conditional memory dump, the computer system comprising:
   one or more processors, one or more computer-readable memories, one or more computer-readable tangible storage devices and program instructions which are stored on at least one of the one or more storage devices for execution by at least one of the one or more processors via at least one of the one or more memories, the program instructions comprising:
      program instructions to execute an introspection program with respect to the software component, wherein the introspection program comprises one or more conditions for generating the conditional memory dump during operations of an operating system of the software component, wherein the one or more conditions are monitored based on at least one of, values of variables in the software component executed in the operating system, operating system usage by the software component executed in the operating system, presence and order of elements on a stack in the software component executed in the operating system, and failure of exceptions in the software component executed in the operating system;
      program instructions to detect, through the introspection program, whether the one or more conditions are satisfied by the software component based on information of an introspection analyzer of the introspection program, wherein the introspection analyzer queries exposed state of operations of the software component, during the operations of the operating system, to determine whether the one or more conditions are satisfied by the software component;
      program instructions to generate the conditional memory dump through the introspection program, if at least one of the one or more conditions are satisfied by the software component during the operations of the operating system, responsive to the detection; and program instructions to generate the conditional memory dump through the introspection program.

8. The computer system according to claim 7, wherein the one or more conditions are defined in the introspection program by a systems administrator or user describing conditions under which memory dumps should be automatically generated based on the operations of the software component.

9. The computer system according to claim 7, wherein program instructions to generate the conditional memory dump, further comprises:

program instructions to copy and store, through the introspection program, a memory image of a runtime environment of the software component into a memory dump unit of a storage device.

10. A computer program product for program introspection of a software component and generation of a conditional memory dump, the computer system comprising:

one or more computer-readable tangible storage devices and program instructions stored on at least one of the one or more storage devices, the program instructions comprising:

program instructions to execute an introspection program with respect to the software component, wherein the introspection program comprises one or more conditions for generating the conditional memory dump during operations of an operating system of the software component, wherein the one or more conditions are monitored based on at least one of, values of variables in the software component executed in the operating system, operating system usage by the software component executed in the operating system, presence and order of elements on a stack in the software component executed in the operating system, and failure of exceptions in the software component executed in the operating system;

program instructions to detect, through the introspection program, whether the one or more conditions are satisfied by the software component based on information of an introspection analyzer of the introspection program, wherein the introspection analyzer queries exposed state of operations of the software component, during the operations of the operating system, to determine whether the one or more conditions are satisfied by the software component;

program instructions to generate the conditional memory dump through the introspection program, if at least one of the one or more conditions are satisfied by the software component during the operations of the operating system, responsive to the detection; and program instructions to generate the conditional memory dump through the introspection program.

11. The computer program product according to claim 10, wherein the one or more conditions are defined in the introspection program by a systems administrator or user describing conditions under which memory dumps should be automatically generated based on the operations of the software component.

12. The computer program product according to claim 10 wherein program instructions to generate the conditional memory dump, further comprises:

program instructions to copy and store, through the introspection program, a memory image of a runtime environment of the software component into a memory dump unit of a storage device.

\* \* \* \* \*